May 18, 1943.  W. REIT  2,319,706
FLUID-DRIVE POWER TRANSMISSION
Filed Aug. 2, 1941
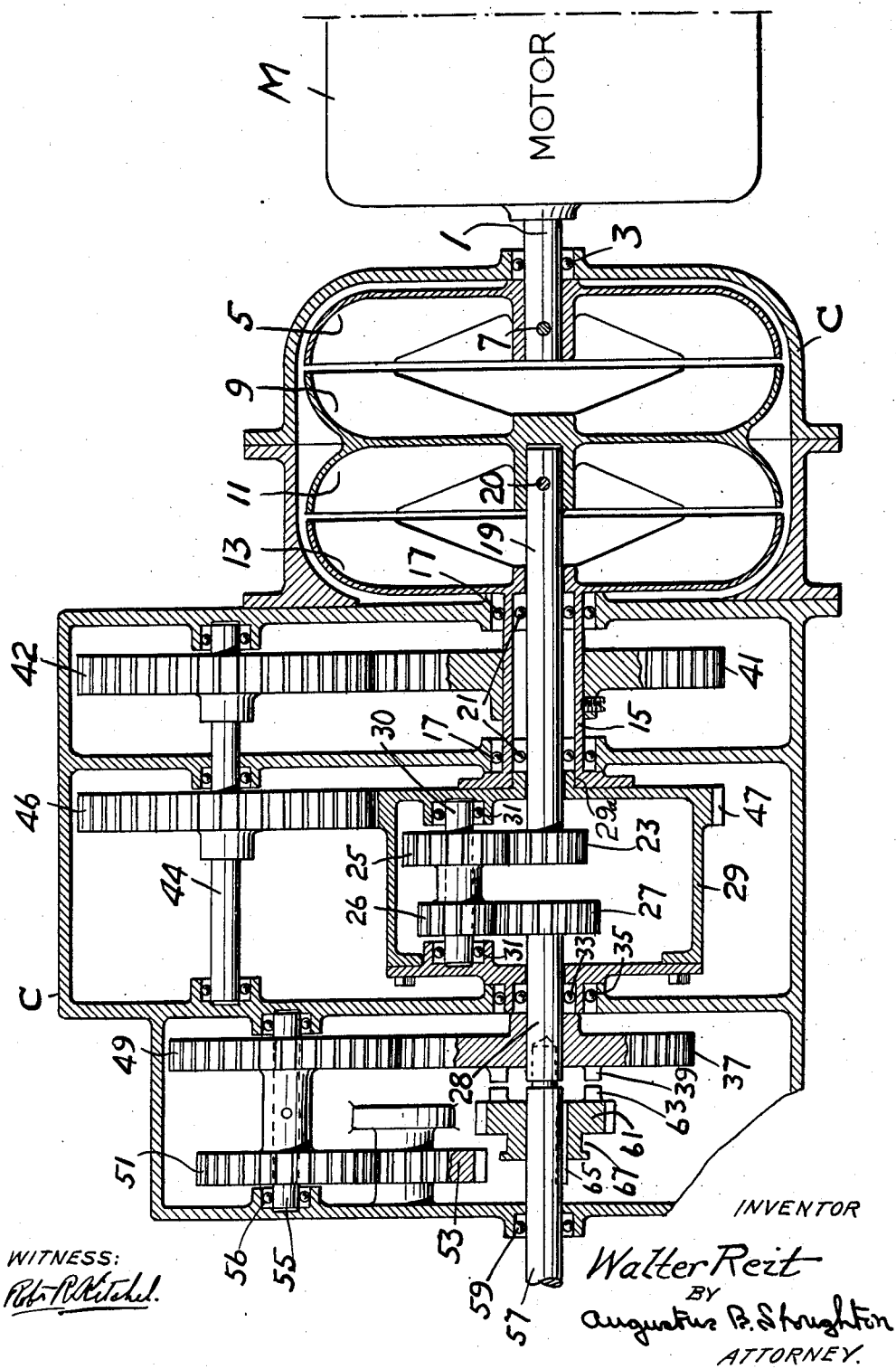
INVENTOR
Walter Reit
BY
Augustus B. Stoughton
ATTORNEY.
WITNESS:

Patented May 18, 1943

2,319,706

UNITED STATES PATENT OFFICE 2,319,706

FLUID-DRIVE POWER TRANSMISSION

Walter Reit, Philadelphia, Pa.

Application August 2, 1941, Serial No. 405,268

4 Claims. (Cl. 74—189.5)

It is an object of my invention to provide means for transmitting power from an engine, motor or other prime mover at varying speeds to a source of utilization such as, for example, the transmission between the internal combustion engine and the driving wheels of an automobile or other vehicle. More specifically, it is a feature of my invention to provide a power transmitter containing at least two trains of gears, which gears are always in mesh. There is thus eliminated the skill required of an operator to shift the gears as well as the wear and strain on the gears caused by the shifting and the damage which may result to the gears because of improper or unskilled operation For a more specific exposition of my invention, reference may be had to the annexed drawing and specification at the end whereof the novel features of my device will be specifically pointed out and claimed.

In the drawing there is shown a diagram with parts in elevation and parts broken away in cross-section.

In that embodiment of my invention selected from among others for illustration in the drawing and description in the specification, my device is shown as comprising, a motor M which may be any type of prime mover or other means serving for the input of power to the device. Motor M has a shaft 1 which projects into a casing generally indicated at C and is supported in casing C by means of bearings 3. Shaft 1 is secured to the first impeller 5 by any convenient means such as a pin 7. Opposite first impeller 5, there is mounted an impeller-propeller unit having at its front face a propeller 9 opposing and adapted to be driven from first impeller 5 and on its rear face an impeller 11 adapted to serve as a second driving impeller. Opposite portion 11 of the dual impeller there is mounted a second propeller unit 13 which is rotatably mounted in casing C by means of a tubular support 15 carried in bearings 17 in casing C.

Impellers 5 and 11 and propellers 9 and 13 are shown as being in general of dish-shape, each having a plurality of radially extending vanes therein, these vanes being wider at the outer portions of the impeller than at the inner portions but may, of course, be of any desired construction.

The propeller-impeller 9, 11 is secured to a stub shaft 19 as by a pin 20. Stub shaft 19 is concentric with tube 15 and is mounted in casing C by means of bearings 17, tube 15 and bearings 21. Stub shaft 19 comprises the driving shaft of the transmission. At its rear, shaft 19 carries a gear 23 which meshes with a gear 25 forming part of a dual gear of which a second part 26 meshes with gear 27 carried on shaft 28 axially aligned with shaft 19. Dual gear 25, 26 is mounted in a rotatable carrier 29 by means of a stub shaft 30 and bearings 31. Carrier 29 is rotatably mounted at its forward end in the rear of tube 15, as at 29a and at its rear end in casing C through bearings 35. Shaft 28 is carried in casing C by means of bearings 33 which are in turn supported by means of carrier 29. At its rear, shaft 28 has a gear 37 fast thereon, the rear face of which is provided with clutch teeth 39.

Propeller 13 is carried by tube 15 which in turn carries gear 41 meshing with gear 42 mounted in casing C by means of stub shaft 44 to which is also fastened gear 46 meshing with gear 47 on the outer periphery of carrier 29

Meshing with gear 37 is a gear 49 forming one element of a second dual gear of which another element 51 meshes with gear 53. Dual gear 49 and 51 is carried in casing C by means of shaft 55 and bearings 56.

Driven shaft 57 is mounted in casing C by means of bearings 59 and has mounted thereon gear 61 which bears on its forward face clutch teeth 63 for coaction with clutch teeth 39 of gear 37. Gear 61 is held against rotation relative to driven shaft 57 by means of key 65 but is slidable along driven shaft 57 by means of a yoke or fork (not shown) which fits into collar 67 on gear 61.

In operation of the apparatus, assuming motor M is operating at a low speed, the propellers 9 and 13 will remain stationary. With an increase of speed of the motor the propeller-impeller 9, 11, picks up in speed rotating shaft 19 and drives output shaft 28 at a reduced speed determined in general by the ratio of the gears 23, 25, 26 and 27. At this time carrier 29 will be substantially stationary and will remain so until the speed of the propeller-impeller element 9, 11 has increased to such a point that propeller 13 is driven. While I have stated that the carrier 29 remains stationary, it will be understood that it only remains relatively so. Actually, during initial torque application to the shaft 28, there will be a retrogressive or clockwise motion of the carrier when viewed from the right, if it is assumed that shaft 1 is rotating in a counterclockwise direction. This will serve to further reduce the actual speed transmitted through the gears 23, 25, 26 and 27 to shaft 28. It will, however, be noted that such reactive rotation of the carrier 29 will be distinctly resisted by reason of the fact that such rotation is transmitted through the gears 46, 42 and 41 to the propeller 13 causing this propeller to tend to rotate in the opposite direction to the impeller 11 which it faces. As the speed of the impeller 11 increases, the resistance to rotation of propeller 13 will correspondingly increase until its motion finally stops and motion of the propeller 13 and accordingly of the carrier 29 in the opposite direction begins. When propeller 13 begins to rotate in the same direction as the propeller 9 the carrier 29 is rotated in its supports at a speed determined by the gears 41, 42, 46 and 47 and the propeller 13, the carrier then becoming a planetary carrier which rotates in the same direction as gear 23. This will, of course, result in an increase in speed of shaft 28, which increase will continue with increase of speed of carrier 29, until the carrier 29 attains its maximum speed as determined by the speed of rotation of propeller 13. While in the present instance the gearing 41, 42, 46 and 47 is shown as approximately in a 1 to 1 ratio, this proportion may obviously be varied as desired. As shown, when the propellers 9 and 13 are rotating at the same speed, the speed of rotation of shaft 28 will be identical with that of shaft 19, since carrier 29 will be moving at the same speed of rotation as gear 23 and there will be no rotative movement of the dual gear element 25, 26.

It will be obvious that if the speed of motor M is suddenly reduced so that the output shaft tends to drive the transmission, this drive will be transmitted through the several gearings to the propellers which will then serve to act as impellers and, therefore, as brakes.

It will be understood that the accompanying illustration is merely given as an example and that the structure may be considerably modified both as to the particular arrangement herein shown and as to the gear ratios employed. I do not, therefore, wish to be understood as limiting myself to the present structure except as hereinafter claimed.

I do not intend to be limited in the scope of my invention save as the attached claims require.

I claim:

1. In a transmission, a driven shaft, a pair of transmission trains for driving said shaft, one of said trains including a planetary carrier for gears included in the other of said trains, said carrier being free to rotate in either direction with relation to said driven shaft and a fluid drive for said trains comprising an impeller, a propeller-impeller unit driven thereby and driving the last-named train, and a second propeller driven by the impeller of the propeller-impeller unit and driving the first-named train.

2. In a transmission, aligned driving and driven shafts provided at adjacent ends thereof with gears, a carrier coaxial with said shafts, said carrier being free to rotate in either direction with relation to either of said shafts, transmission gearing rotatably supported by the carrier and connecting the gears of said shaft, a tube surrounding the driving shaft, a driving connection between said tube and carrier, a propeller on the tube, a propeller-impeller unit on the driving shaft with the impeller element thereof in driving relation to the propeller of the tube, and a driven impeller in driving relation to the propeller of the propeller-impeller unit.

3. In a transmission, a driven shaft, a pair of transmission trains for driving said shaft, one of said trains including a planetary carrier for gears included in the other of said trains, said carrier being free to rotate in either direction with relation to said driven shaft, a drive shaft for the last-named train, a fluid impeller on said drive shaft and a propeller driven by the impeller of said drive shaft and driving said first-named train.

4. In a transmission, aligned driving and driven shafts provided at adjacent ends thereof with gears, a carrier coaxial with said shafts, said carrier being free to rotate in either direction with relation to either of said shafts, transmission gearing rotatably supported by the carrier and connecting the gears of said shafts, a tube surrounding the driving shaft, a propeller on the tube, an impeller on the driving shaft in driving relation to said propeller, said carrier comprising a gear, a gear on said tube and gearing connecting the gear of the carrier and the gear on said tube.

WALTER REIT.